March 27, 1928. 1,664,211
D. B. HANNA
CAGE MAKING MACHINERY
Filed Aug. 15, 1921 2 Sheets-Sheet 1
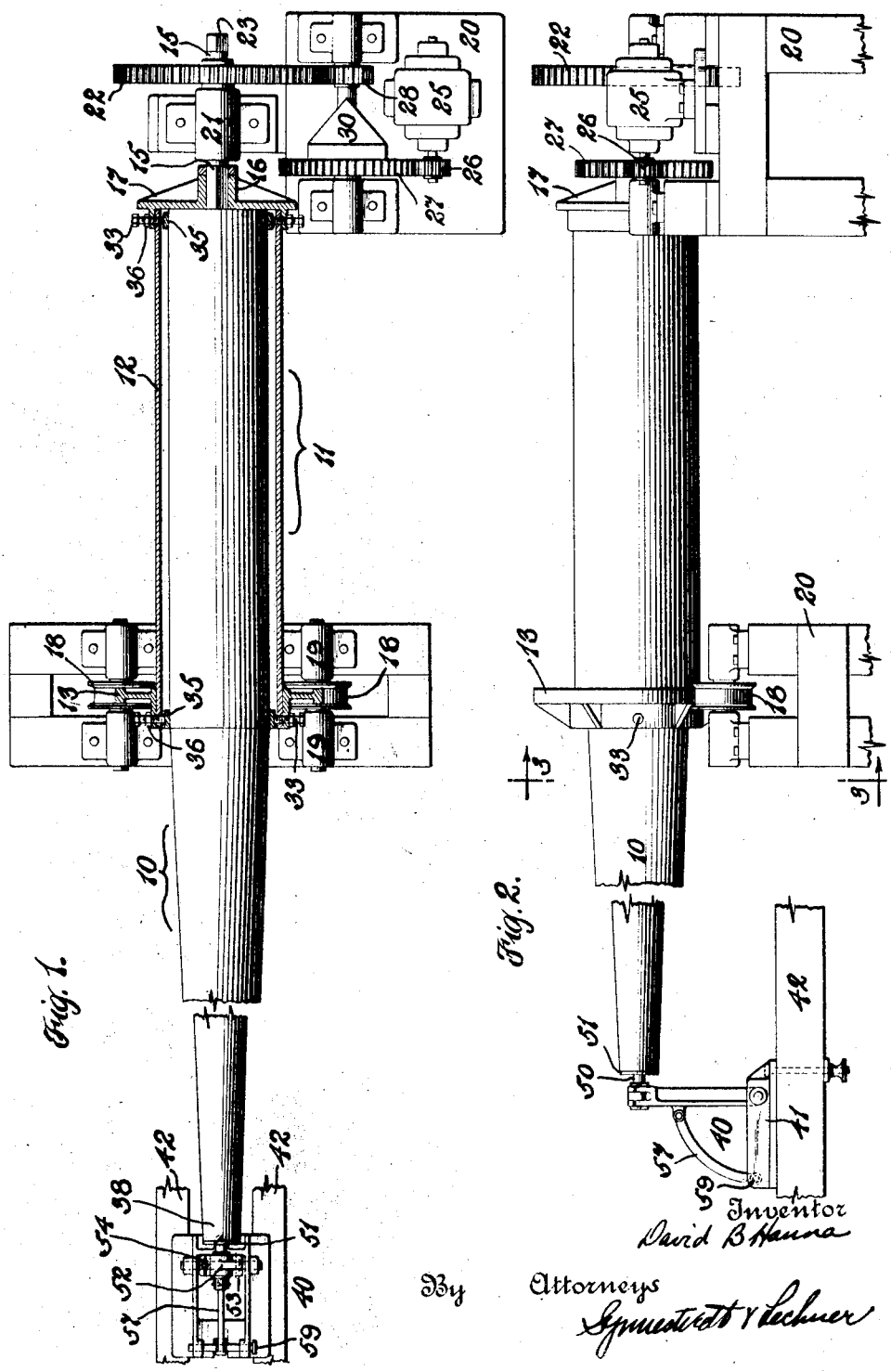

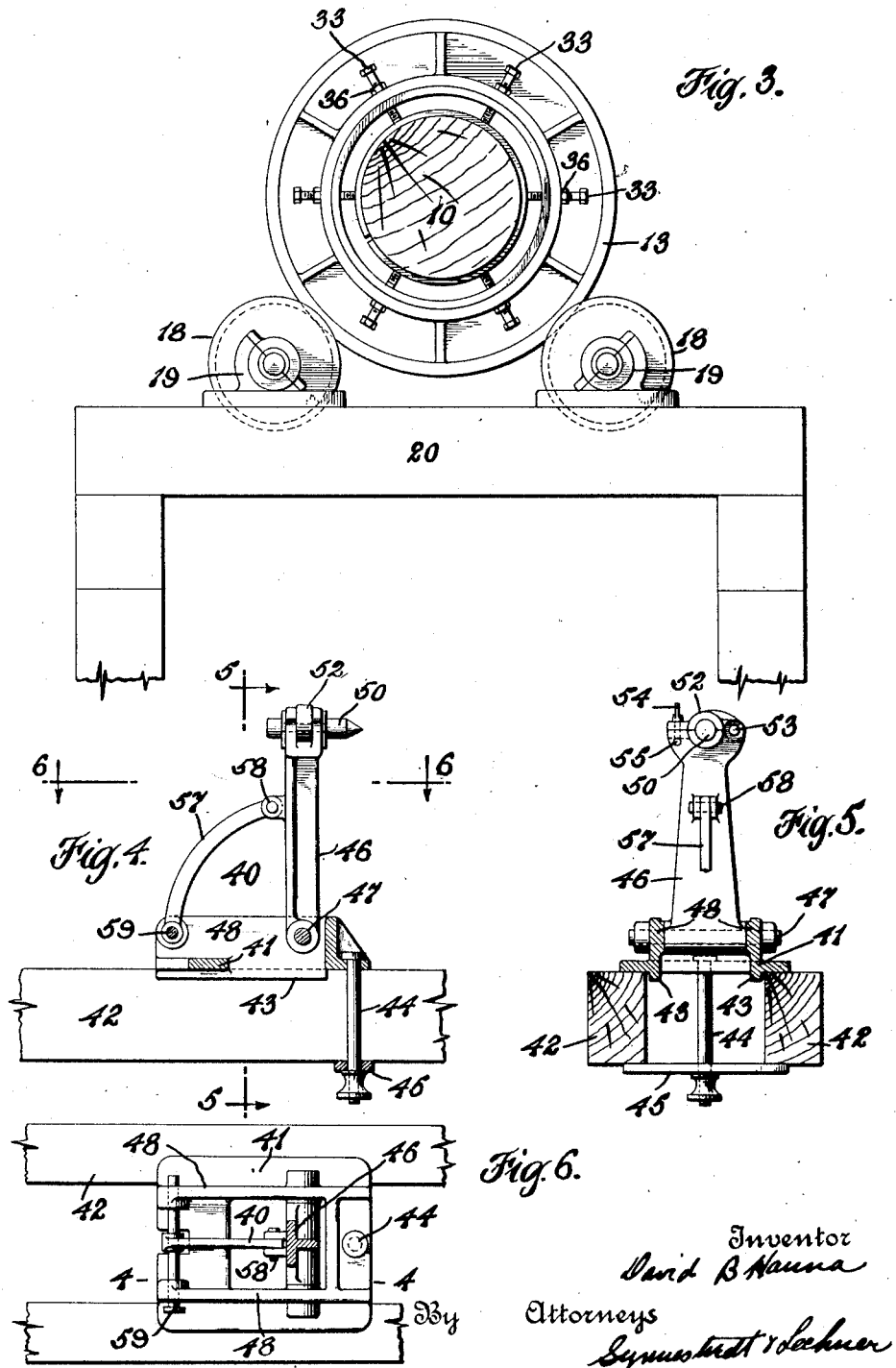

Patented Mar. 27, 1928.

1,664,211

UNITED STATES PATENT OFFICE.

DAVID B. HANNA, OF CHICAGO, ILLINOIS, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

CAGE-MAKING MACHINERY.

Application filed August 15, 1921. Serial No. 492,210.

My invention relates to cage making machinery, that is to say, machines and mechanism for making metal rod and wire cages for reinforcing concrete poles or posts, such as telegraph and trolley line or lighting poles and the like. I aim to make the machine simple and rugged in construction, and convenient, durable, and free from derangement in use, and permitting ready removal of the completed cage. I further aim to facilitate the insertion, removal, interchange, and centering of the winding mandrels which I employ, and to provide for adapting the machine to mandrels of varying dimensions.

How these and other advantages can be secured in accordance with my invention will appear from the following description of the best embodiment of the invention at present known to me.

In the drawings, Fig. 1 is a plan view of a machine conveniently embodying my invention, certain intermediate parts being broken out and omitted for the sake of illustration, and one of the parts shown appearing in horizontal mid-section.

Fig. 2 is a side elevation of the machine.

Fig. 3 is a sectional view, on an enlarged scale, taken as indicated by the section line 3—3 in Fig. 2.

Fig. 4 is a side view of the tail stock and associated parts, with certain parts in vertical longitudinal section as indicated by the line 4—4 in Fig. 6.

Fig. 5 is a similar rear view, taken as indicated by the line 5—5 in Fig. 4.

Fig. 6 is a similar plan view, taken as indicated by the line 6—6 in Fig. 4.

The mandrel 10 shown in Figs. 1, 2, and 3 corresponds in form to the interior of the cage to be eventually produced, comprising a tapering portion for forming the cage as well as a cylindrical or butt end portion. In practice, the longitudinal reinforcing rods for the pole are usually laid lengthwise along the tapering portion of the mandrel 10, and wire is then wound about them as the mandrel is revolved,—being subsequently secured to the rods by any of a number of suitable ways.

Still referring to Figs. 1, 2, and 3, it will be seen that the cylindrical butt of the mandrel 10 is mounted and secured in a hollow rotary headstock 11 which in part comprises a sleeve 12, such as a five foot length of fifteen inch steel pipe. This sleeve 12 is externally supported at one end by bearing means comprising a laterally flanged concentric tire 13 surrounding and fitted on the sleeve with a close fit, while at its other end it is supported by means of a journal shaft 15 whose squared end is secured in the hub or boss 16 of a laterally flanged cap 17, also fitted on the sleeve. The tire 13 rests on grooved rollers 18 journaled in bearings 19 on the machine framework or pedestal 20, while the journal 15 extends through a similarly supported bearing 21 and carries an overhung driving gear 22. The outer end of the shaft 15 is squared at 23 to afford a convenient means of turning the headstock by hand. Ordinarily, however, the headstock is driven by an electric motor 25 through a train of reduction gearing 26, 27, 28. A friction clutch 30 interposed between the gears 27 and 28, serves as a drive connection and as a safety device to prevent breakage of the wire being wound or extreme overloading of the motor 25 if the wire becomes caught,—and may also facilitate the starting of the motor.

The winding mandrel 10 may be adjustably centered or alined and secured in the rotary sleeve 12 by means of set-screws 33 (six being shown in each instance) threaded through the sleeve 12 and the lateral flanges of the parts 13 and 17, and bearing on split collars 35 surrounding the butt of the mandrel 10. As shown, lock-nuts 36 are provided for securely locking the set-screws 33 when properly tightened up.

The small end 38 of the mandrel 10 may be supported by means of a tailstock structure 40 clearly shown in Figs. 1, 2, 4, 5, and 6. The tailstock structure 40 comprises a base plate 41 slidably adjustable along ways 42 extending lengthwise of the machine frame, and having depending guide flanges 43. This base 41 may be clamped and secured in any desired position on the ways 42 by means of a screw bolt 44 extending through the forward end of the base and through a clamping plate 45 beneath said ways. Near the forward end of the base 41, a tailstock arm 46 is pivoted, at 47, between upstanding flanges 48 on the base, and in the upper end of this arm is mounted a conically pointed center-pin 50, adapted to bear in a conical center hole in a plate 51 fastened by wood-screws (not shown) on the end of the mandrel. The center-pin 50 rests in a semicircular seat in the arm end, and is secured fast by means of a similarly seated clamp piece 52 having one end pivoted to the arm at 53 and the other held down by means of a wing-nut 54 on a screw 55 whose ball-shaped lower end is so secured in the arm as to permit it to swing a little to facilitate its entering its hole in the piece 52. The enclosed portion of the pin 50 and its seats might, of course, have appropriate correlative engagement means for positively preventing longitudinal shifting of the pin in the clamp. The arm 46 is normally maintained in the upstanding operative position shown in Figs. 1, 2, etc., by means of a strut 57 pivoted to the arm at 58 and having its other end secured at the rear of the base 41 by a removable pin 59.

It will be seen, therefore, that the tailstock structure 40 as a whole may readily be adjusted longitudinally as required by winding mandrels of various lengths, and that the center-pin 50 may likewise be adjusted somewhat in the tailstock arm 46 to give a firm bearing on the plate 51. On the other hand, the tailstock arm 46 may readily be shifted to facilitate insertion and removal of the mandrel 10 when necessary, and also the removal of the completed cage, by simply withdrawing the pin 59 from the strut 57 and swinging the arm rearward back down out of the way. To facilitate withdrawal of the pin 59 for this purpose, of course, the pin 50 may, if desired, first be released by loosening its clamp 52, and allowed to recede enough to relieve the lateral pressure on said pin 59.

If it should be desirable to have the ends of the longitudinal members of the cage extend beyond the cage proper, i. e., to have free ends on the cage, such ends may extend into the space between the butt of the mandrel and the hollow headstock, and if necessary for this purpose, the collars 35 may be dispensed with.

It will be seen that the apparatus is simple and effective, particularly as to the supporting features thereof, an important feature where the mandrel is of considerable length. Other advantages will occur to those skilled in the art.

I claim:

1. Cage making mechanism comprising a winding mandrel, a rotary hollow headstock with means for driving it and for centering and securing the winding mandrel in it; a longitudinally adjustable tailstock base; a tailstock arm having a center pin for engaging endwise with the mandrel and pivoted to said base to swing rearwardly downwardly out of the way to permit insertion or removal of the mandrel, means for securing said center pin comprising semicircular clamping members and means for normally maintaining said tailstock arm in its operative upstanding position.

2. Cage making mechanism comprising a winding mandrel, a hollow rotary headstock with means for driving it and for centering and securing the winding mandrel in it; a tailstock with a center pin for engaging the mandrel swingable out of the way to permit insertion or removal of the mandrel, with means for securing said pin fast in said tailstock or releasing it to facilitate shifting of said tailstock as aforesaid.

3. Cage making mechanism comprising a mandrel, a rotary headstock with means at either end thereof for adjustably alining, centering, and securing the mandrel therein, and a tailstock for the other end of the mandrel.

4. Cage making mechanism comprising a winding mandrel, a rotary sleeve with means for adjustably centering and securing the winding mandrel therein, a journal attached to one end of said sleeve, and a bearing therefor; bearings for the other end of said sleeve, and a tailstock for supporting the other end of the mandrel.

5. Cage making mechanism comprising a mandrel, a rotary sleeve with means for adjustably alining, centering, and securing the mandrel therein; a journal mounted on one end of said sleeve, and external bearing means for the other end thereof; and means for driving said sleeve.

6. Cage making mechanism comprising a mandrel, a rotary sleeve with a journal mounted on one end thereof and a tire at its other end; a journal bearing for said journal, and means for driving the sleeve at the journal end; roller bearings on which said tire rides; and means for securing and centering the mandrel in either end of said sleeve.

7. Cage making mechanism comprising a mandrel, a rotary sleeve with means for adjustably centering and securing the mandrel therein; a journal mounted on one end of said sleeve, and external bearing means for the other end thereof; and means for driving said sleeve including a friction connection.

8. Cage making mechanism including a hollow headstock adapted to receive a mandrel, means for supporting the headstock, a mandrel having a diameter such as to leave a space between the mandrel and the wall of the headstock, means comprising concentric split collars and set-screws for alining, centering, and securing the mandrel in the headstock, and driving means.

In testimony whereof, I have hereunto signed my name.

DAVID B. HANNA.